(12) United States Patent
Landseadel

(10) Patent No.: US 10,245,961 B2
(45) Date of Patent: Apr. 2, 2019

(54) INVERTER-CHARGER COMBINATION

(71) Applicant: Current Ways, Inc., Santee, CA (US)

(72) Inventor: Bradley A. Landseadel, Simi Valley, CA (US)

( * ) Notice: Subject to any disclaimer, the term of this patent is extended or adjusted under 35 U.S.C. 154(b) by 0 days.

(21) Appl. No.: 15/610,094

(22) Filed: May 31, 2017

(65) Prior Publication Data

US 2017/0349053 A1    Dec. 7, 2017

Related U.S. Application Data

(60) Provisional application No. 62/344,368, filed on Jun. 1, 2016.

(51) Int. Cl.
| | |
|---|---|
| *H02M 7/757* | (2006.01) |
| *B60L 11/18* | (2006.01) |
| *H02J 7/02* | (2016.01) |
| *H02M 1/088* | (2006.01) |
| *H02M 7/797* | (2006.01) |

(52) U.S. Cl.
CPC ....... *B60L 11/1812* (2013.01); *B60L 11/1814* (2013.01); *B60L 11/1851* (2013.01); *H02J 7/022* (2013.01); *H02M 1/088* (2013.01); *H02M 7/797* (2013.01)

(58) Field of Classification Search
CPC .............. B60L 11/1811; B60L 11/1812; B60L 11/1814; H02M 7/757; H02M 7/7575; H02J 7/022; H02J 7/0065; H02J 7/0068

USPC ..... 307/10.1, 43, 44, 45, 46, 48, 64, 66, 82, 307/85
See application file for complete search history.

(56) References Cited

U.S. PATENT DOCUMENTS

| | | | | |
|---|---|---|---|---|
| 2012/0019212 | A1* | 1/2012 | Krauer ...................... | H02J 7/00 320/137 |
| 2013/0069424 | A1* | 3/2013 | Kajouke ............. | B60L 11/1812 307/9.1 |
| 2013/0308361 | A1* | 11/2013 | Steigerwald ............ | H02M 5/12 363/129 |
| 2015/0231978 | A1* | 8/2015 | Danner ............... | B60L 11/1814 307/10.1 |
| 2015/0380965 | A1* | 12/2015 | Lun ....................... | H02J 7/0068 320/107 |

* cited by examiner

*Primary Examiner* — Alex Torres-Rivera
(74) *Attorney, Agent, or Firm* — Themis Law

(57) ABSTRACT

An inverter-charger combination includes plurality of first and second switching elements, a capacitor, and a dual active bridge, connected in parallel to one another. The first and the second switching elements are connected in series to form switching subassemblies that are disposed in parallel and are connected to an AC source. Each of the first and the second switching elements has a first and a second contactor, and, when the first contactor is open and the second contactor is closed, an electric current flows from a rechargeable energy storage system (RESS) in direct current form to a load in AC form through the switching subassemblies to provide power to the load, and when the first contactor is closed and the second contractor is open, an electric current flows from the AC source in AC form to the RESS in DC form through the switching subassemblies to charge the RESS.

7 Claims, 5 Drawing Sheets

INVERTER-CHARGER COMBINATION

FIELD OF THE INVENTION

The present invention relates to an apparatus that combines an electrical inverter with an electrical charger. In one exemplary use, the invention relates to an inverter-charger combination that both transmits electrical power to a traction motor of an electric vehicle and provides an electrical charge to the battery of the same vehicle.

BACKGROUND OF THE INVENTION

Electric vehicles in the prior art almost exclusively deploy inverters that take direct current (DC) power and voltage from one or more on-board batteries and convert that power to an alternating current (AC) voltage and power to drive different types of electric motors. These inverters are typically called "traction inverters" and consume most of the onboard battery power of the electric vehicle. An exemplary electrical inverter in the prior art is illustrated in FIG. 1.

Coexisting on present electric vehicles are charging devices that typically accept AC power and voltage from the electric utility grid and convert that power and voltage to DC power and voltage to charge the batteries while the vehicle is stationary. An exemplary electrical charger in the prior art is illustrated in FIG. 1. These types of chargers typically include a dual active bridge, an example of which is illustrated in FIG. 3.

The traction inverter and the charger operate independently, yet have very similar functionality, components and structures. Additionally, the traction inverter and the charger operate on the vehicle in a mutually exclusive manner, wherein one can only operate when the other one is not operating.

Past attempts at combining inverting and charging in a single device have proven that traction inverter and charger can be combined but either at the expense of charging efficiency or of costly methods involving the use of the traction motors with a winding inductance that interacts with the AC electrical power grid.

Attempts to use the same semiconductors that drive the electric motor to convert the AC power and voltage from the electric utility grid and charge the battery have proven that semiconductor losses, particularly switching losses—those losses incurred in the states between the off and on states and the on and off states of the semiconductor—are sufficiently high to make charging efficiency unacceptable under present industry requirements. Main cause is the primary design objective of the semiconductor, that is, providing sufficient current to drive the traction motor. Such current is usually 10 to 20 times the current required to charge the battery given typical AC level 1 and AC level 2 electric vehicle supply equipment (EVSE), which are prevalent in residential charging domains.

Because of the need for relatively high currents, presently used semiconductor packages consist of a number of paralleled insulated gate bipolar transistors (IGBT's). Each paralleled IGBT incurs losses as it transitions from a low loss off state to a low loss on state and, conversely, from a relatively low loss on state back to a low loss off state again every pulse width modulated (PWM) cycle.

The PWM frequency for driving the traction motor is relatively low in comparison to the PWM frequency of a typical active front end (AFE) deployed in a charger. The lower PWM frequency of use for a traction motor is due to the relatively low harmonic or passive losses incurred in the traction motor during operation and the need to keep switching losses relatively low in view of the overall losses incurred at the high currents required to propel the vehicle.

Conversely, the AFE of the charger requires higher switching frequencies to reduce the magnetics (inductors) required between the semiconductors of the active front end and the electric utility grid. Additionally, the charger requires about $1/20^{th}$ to $1/10^{th}$ of the current that is required of the traction motor and traction inverter.

BRIEF SUMMARY OF THE INVENTION

In one aspect, the invention combines the functions of powering a load and charging a rechargeable energy storage system (RESS) into a single device without compromising efficiency. In an electric vehicle application, a device according to the invention fulfills the requirements of the traction inverter, namely, higher currents for vehicle propulsion and lower switching frequencies, with the requirements of the charger, namely, lower currents for charging and higher switching frequency. The topology in an inverter-charger combination according to the invention enables optimal operation of both functions.

In one embodiment, an inverter-charger combination according to the invention comprises a plurality of first and second switching elements, which are adapted to be electrically coupled to a load and to a RESS. Each first switching element is connected in series with a second switching elements to form a first switching subassembly, and the switching subassemblies are connected in parallel to a dual active bridge, which is adapted to be electrically coupled to the RESS, and to a capacitor. Each switching subassembly is also electrically connected to an AC source. The RESS may be a battery and the load may be a traction motor of an electric vehicle.

Each of the first and the second switching elements includes a plurality of switching units disposed in parallel and a first and a second contactor. When the first contactor is open and the second contactor is closed, electric current is enabled to flow from the RESS in DC form to the load in AC form through the first and second switching elements to provide power to the load, and, when the first contactor is closed and the second contractor is open, electric current is enabled to flow from the AC source in AC form to the RESS in DC form through the first and second switching elements to charge the RESS.

In one embodiment, there are three first and three second switching elements forming three first switching subassemblies, making the inverter-charger combination adapted for three phase operation.

In one embodiment, the inverter-charger combination further includes a plurality of third switching elements, with two of the third switching elements disposed in series to form a second switching subassembly disposed in parallel with the first switching subassemblies. Each of the third switching elements has a plurality of switching units disposed in parallel, and the second switching subassembly is electrically connected to the load but not to the RESS.

In one embodiment, the plurality of first and second switching elements consists of two first and two second switching elements forming two first switching subassemblies, and the plurality of third switching elements consists of two third switching elements forming the second switching subassembly, causing the inverter-charger combination to be adapted for single phase operation.

The switching units may be insulated-gate bipolar transistors (IGBT's), metal-oxide-semiconductor field-effect transistors (MOSFET's), silicon carbide (SiC) transistors, or gallium nitride (GAN) or any other power switching-transistors. In one embodiment, all the switching units are IGBT's.

In one embodiment, at least some of the first and second switching elements are configured to have only one or more of the switching units active during the charging of the RESS and all the switching units active during power transmission to the load.

It is an aspect of the present invention that, by utilizing parallel IGBT's, MOSFET's, or SiC, GAN or any other power semiconductor units that can be switched in and out of the circuit topology, high current operation can be achieved for vehicle propulsion.

It is another aspect of the present invention that, by utilizing parallel IGBT's, MOSFET's, or SiC, GAN or any other power semiconductor units that can be switched in and out of the circuit topology, lower current and higher switching frequency can be achieved for the charging function without sacrificing efficiency and reducing the size of the inductors that interface to the AC electrical power source for charging.

It is still another aspect of the present invention that the use of the traction inverter and the charger are mutually exclusive, therefore, the same processor can be used to control both powering and charging functions, thereby reducing costs.

It is still another aspect of the present invention that the use of the traction inverter and the charger are mutually exclusive. As a result, the same DC link structures can be used for both powering and charging functions, thereby reducing costs.

It is still another aspect of the present invention that the cost of the switching elements, which allows for selective use of the semiconductors is relatively inexpensive compared to the cost of the similar structures that will be utilized for both powering and charging functions in a combined device.

It is still another aspect of the present invention that by reducing the number of paralleled semiconductors during charging, charging frequency can be increased, due to the reduced switching losses associated with utilizing less paralleled devices, to reduce magnetics costs, size and weight.

It is still another aspect of the present invention that by using all of the required paralleled semiconductors during propulsion for the traction motor and traction inverter, the on-state losses can be optimized for this function.

It is still another aspect of the present invention that by optimizing PCB layout for the paralleled semiconductors to reduce and normalize gate inductance and impedance, a reduction in the number of gate drivers can be achieved, that is, a one-for-one semiconductor to gate driver is not necessary.

It is still another aspect of the present invention that by deploying a highly efficient DC-DC converter with sufficient current to deliver DC current to the traction inverter, a constant or variable DC link voltage strategy can be developed that optimizes motor performance irrespective of the state of charge of the battery of the vehicle.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
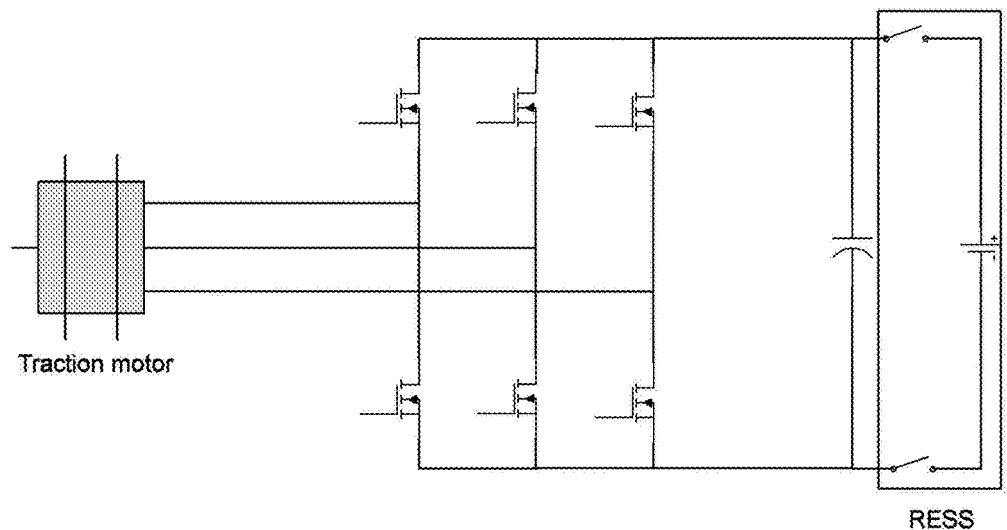
FIG. 1 is a schematic view of traction inverter in the prior art.
Figure 2:
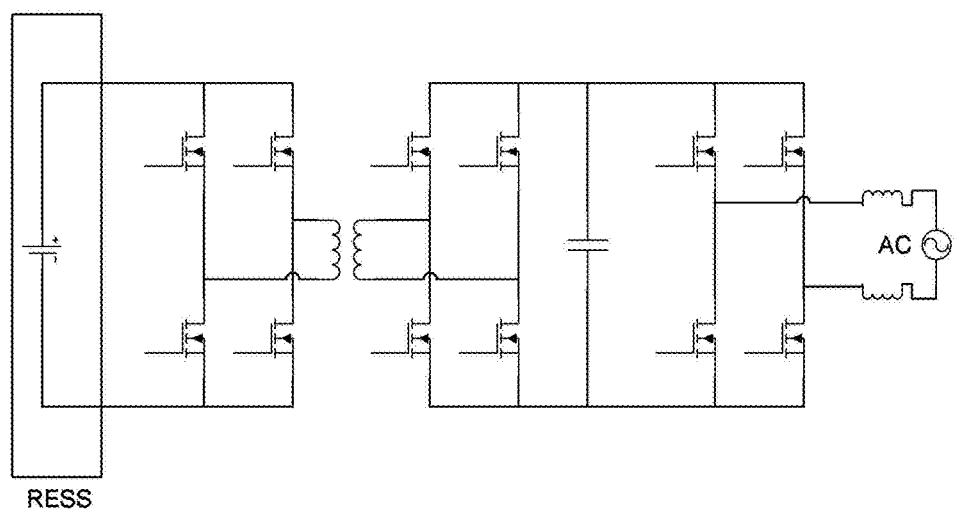
FIG. 2 is a schematic view of single phase charger in the prior art.
Figure 3:
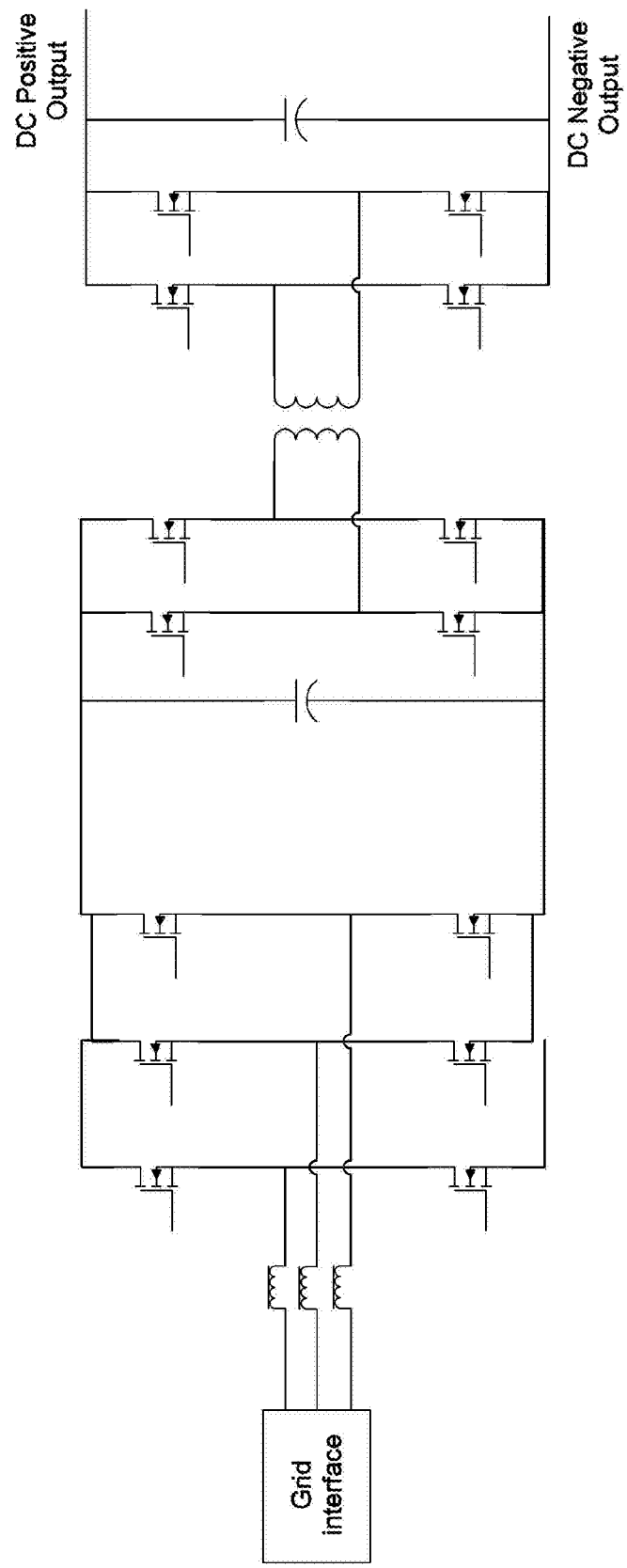
FIG. 3 is a schematic view of a dual active bridge in the prior art.
Figure 4:
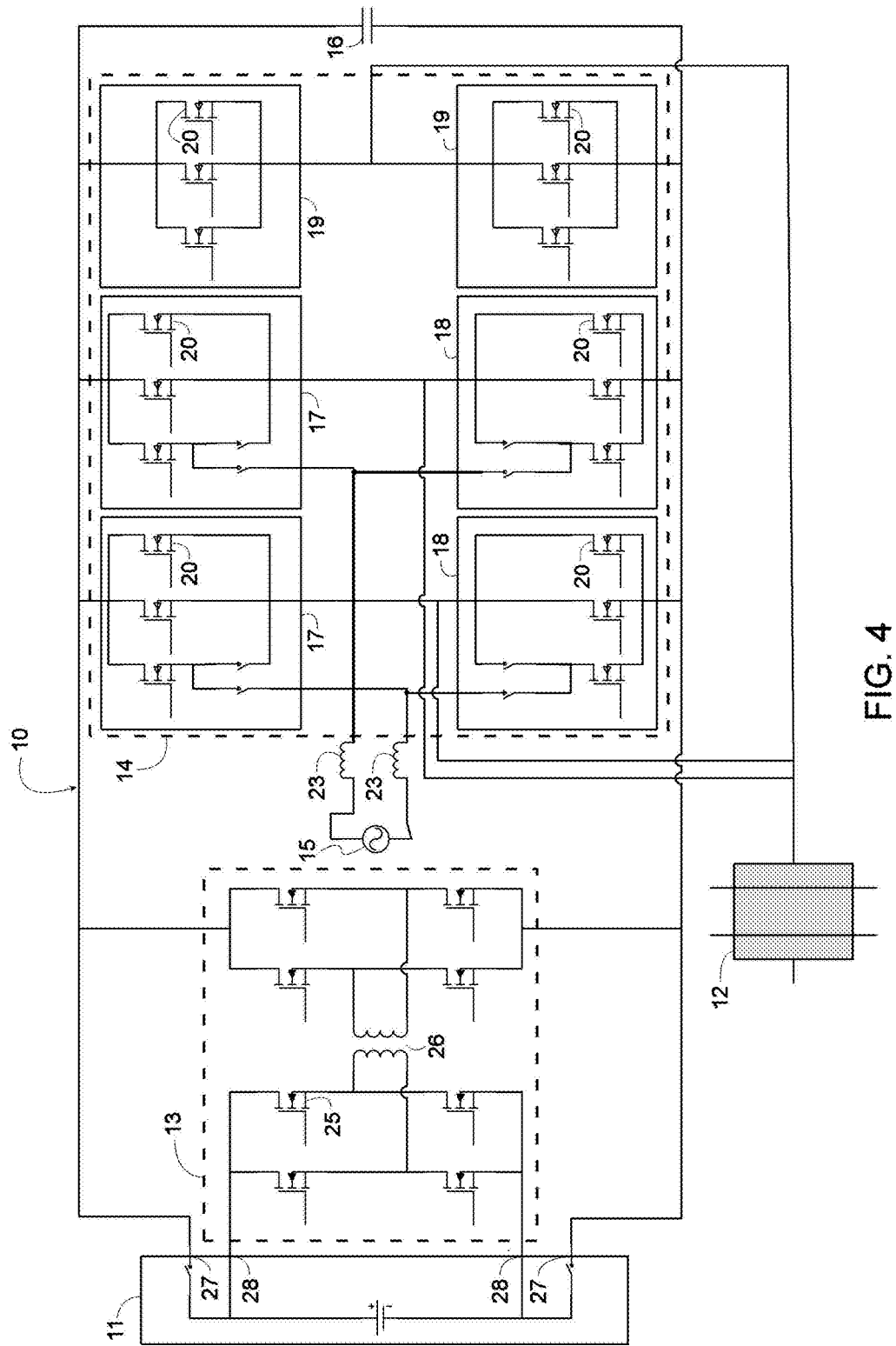
FIG. 4 is a schematic view of an inverter-charger combination according to the invention that is adapted for single phase charging.

FIG. 4 illustrates an inverter-charger combination 10 according to a first embodiment of the invention, which is operatively coupled to a rechargeable energy storage system (RESS) 11 at one end and to a load 12 at another end. In one example of use, RESS 1 is a battery and load 12 is a traction motor of an electric vehicle. This embodiment is adapted for single phase charging, as will be discussed in greater detail later.

The basic components of inverter-charger combination 10 include a dual active bridge 13, a plurality of switching elements 14.

Dual active bridge 13 provides galvanic isolation to RESS 11 and comprises a plurality of RESS-side switches 25 and a dual active bridge transformer 26. As shown in FIG. 4, dual active bridge 13 is interposed between the plurality of switching elements 14 and is connected in parallel with plurality of switching elements 14 and with capacitor 16, which operates as a direct current (DC) link capacitor. RESS 11 is connected to inverter-charger combination 10 at contactor ports 27 and charging ports 28.

Figure 5C:
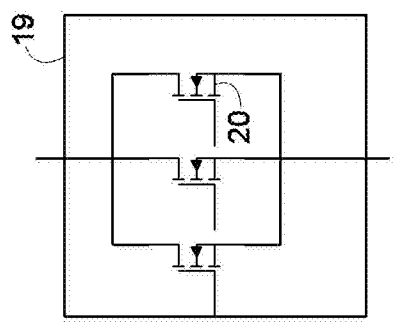
FIGS. 5a, 5b, and 5c are schematic views of Type I, Type II, and Type III switching elements according to the invention.
Figure 5B:
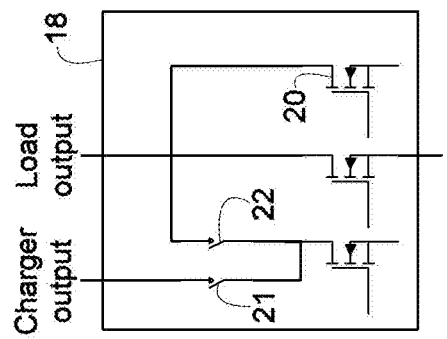
Figure 5A:
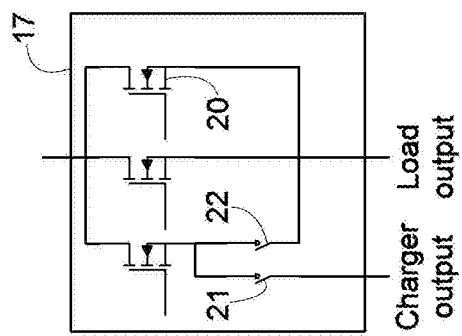

Turning now to FIGS. 4 and 5a-5c, the plurality of switching elements 14 includes switching elements of different types, which will be identified hereunder respectively as Type I, illustrated in FIG. 5a and having reference number 17; Type II, illustrated in FIG. 5b and having reference number 18; and Type III, illustrated in FIG. 5c and having reference number 19.

These switching elements 17, 18, and 19 include a plurality of switching units 20 disposed in parallel, which, in different embodiments, may be insulated-gate bipolar transistors (IGBT's), metal-oxide-semiconductor field-effect transistors (MOSFET's), silicon carbide (SiC) transistors, gallium nitride (GAN) transistors, or other types of semiconductors known to a person of skill in the art. For ease of description, and without limiting intent, switching units 20 will be considered in the present and subsequent embodiments to be IGBT's.

Type I and Type II switching elements 17 and 18 further include a first contactor 21, providing a charger output when closed, and a second contactor 22, providing a load output when closed.

The arrangement of the switching elements in the present embodiments includes having two Type I and two Type II disposed in two subassemblies, each having one Type I switching element 17 (shown in the upper portion of FIG. 4) connected in series to one Type II switching element 18 (shown in the lower portion of FIG. 4). A third subassembly includes two Type III switching elements connected in series. The three presently described subassemblies are disposed in parallel with one another.

Each of the two subassemblies of Type I and Type II switching elements is electrically connected to an alternating current (AC) source 15 through inductors 23, and each of the three subassemblies of Type I, Type II, and Type III switching elements is electrically connected to load 12.

Turning again to FIG. 4, it will be recognized that, when first contactors 21 are open and second contactors 22 are closed, a first electric current is enabled to flow starting from RESS 11 in direct current (DC) form through the three switching subassemblies to provide power to load 12 in AC form. Instead, when first contactors 21 are closed and second contractors 22 are open, a second electric current is enabled to flow starting from the AC source in AC form only through the two subassemblies of Type I and Type II switching elements to be received in DC form at RESS 11 to charge RESS 11.

Therefore, in single phase charging, only the two subassemblies of Type I and Type II switching elements are active when charging RESS 11, and all three subassemblies of Type I, Type II, and Type III switching elements are active instead when driving load 12 (for example, a three phase induction motor).

Typically, an inverter-charger according to this first embodiment is used for single-phase charging of a RESS up to 19.2 kW, and more typically for single-phase charging of a RESS up to 10 kW.

Figure 6:
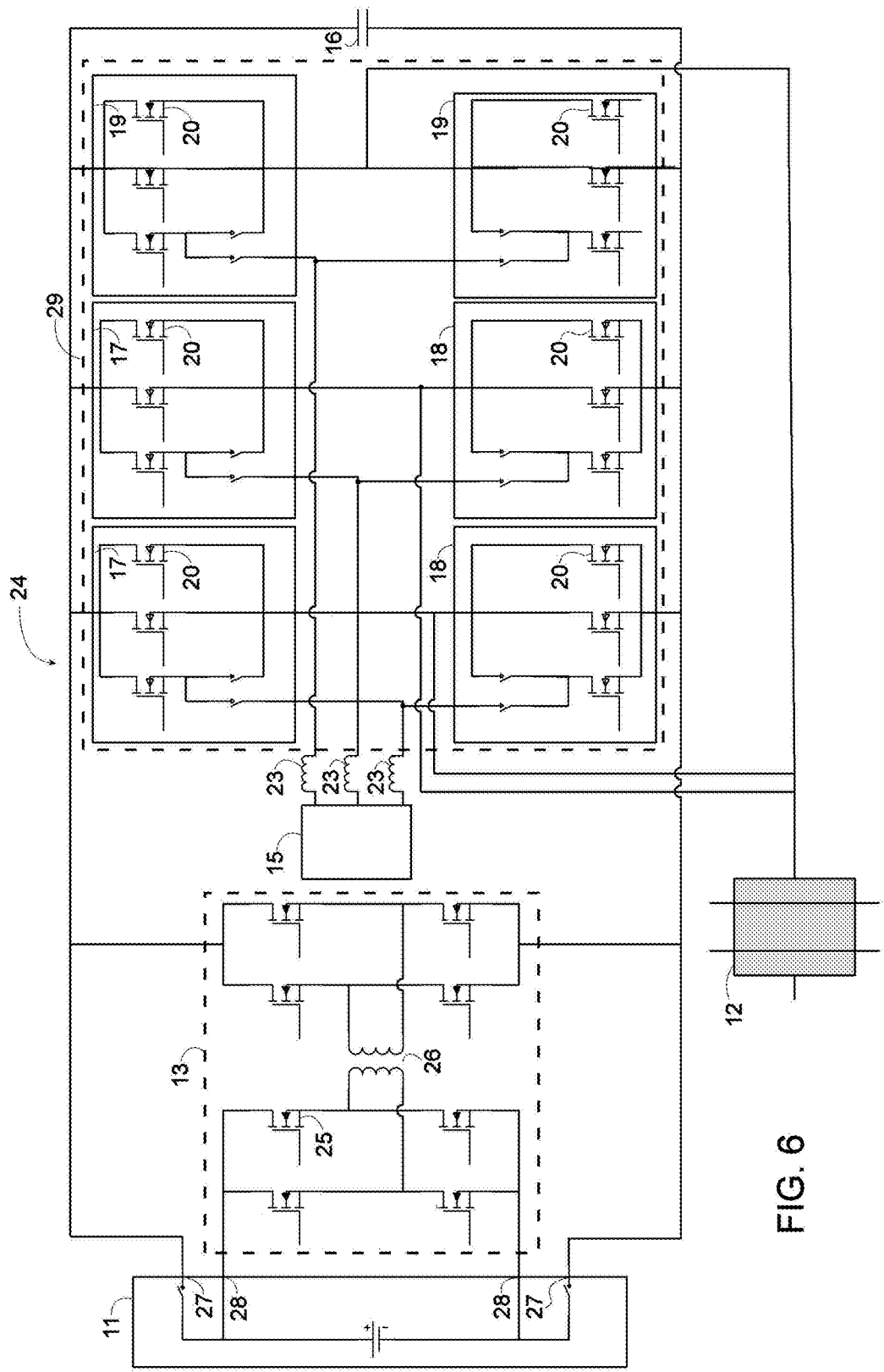
FIG. 6 is a schematic view of another inverter-charger combination according to the invention that is adapted for three phase charging.

FIG. 6 illustrates an inverter-charger combination 24 according to a second embodiment of the invention, which is also operatively coupled to a RESS 11 at one end and to a load 12 at another end. This embodiment is adapted for three phase charging. In this second embodiment 24, the same components will be identified with the same reference numbers as in first embodiment 10.

As in first embodiment 10 depicted in FIG. 4, second embodiment 24 includes a dual active bridge 13, a plurality of switching elements 29, and a capacitor 16. Also as in first embodiment 10, dual active bridge 13, plurality of switching elements 29, and capacitor 16 are connected to one another in parallel.

Differently from first embodiment 10, however, the plurality of switching elements 29 comprises only Type I and Type II switching elements that are arranged in three subassemblies connected to one another in parallel. Each subassembly is composed of one Type I switching element 17 and one Type II switching element 18 connected in series, such that the three upper switching elements 17 in plurality 29 of FIG. 6 are Type I and the three lower ones 18 are Type II.

An AC source 15 provides AC to the three subassemblies of switching elements 17 and 18, each of the subassemblies being connected to AC source 15 through an inductor 23. Each of those subassemblies is also electrically connected to load 12.

An inverter-charger combination according to this second embodiment may be used for three-phase charging of a RESS above 19.2 kW, and, more typically, may be used for three-phase charging of a RESS above 10 kW.

As it can be seen, in an inverter-charger combination according to the invention, the use of the traction inverter and the charger are mutually exclusive so the same processor can be used to control both functions, reducing costs. Moreover, the same DC link structures can be used for both functions, also reducing costs.

It can also be seen that, in an electric vehicle, by deploying a highly efficient DC-DC converter with sufficient current to deliver DC current to the traction inverter, a constant or variable DC link voltage strategy can be developed that optimizes motor performance irrespective of the state of charge of the battery of the vehicle.

While the preceding two embodiments include six switching elements 17, 18, or 19, it should be understood that other embodiments may include different numbers of switching elements and subassemblies thereof.

Further, FIGS. 4-6 show that each of switching elements 17, 18, and 19 has three switching units 20 (for example, three IGBT's). In different embodiments of the invention, however, switching elements 17, 18, and 19 may have different numbers of switching units 20.

Turning now to another aspect of the invention, Type I and Type II switching elements 17 and 18 may be designed so that only some of switching units 20 are active during charging, thereby reducing switching losses, while all of switching units 20 are active to provide power to load 12.

By reducing the number of paralleled semiconductors during charging, the charging frequency can be increased to reduce the cost of magnetics, size and weight. By using instead all of the required paralleled switching units 20 during propulsion for the traction motor and traction inverter, on-state losses can be optimized for this function.

Therefore, with an inverter-charger combination according to the invention, in which switching units 20 can be switched in and out of circuit topology, high current operation can be achieved for vehicle propulsion, and lower current and higher switching frequency can be achieved for charging function without sacrificing efficiency.

Moreover, with a design according to the invention, PCB layout for the paralleled semiconductors is optimized and gate inductance and impedance are reduced and normalized, making it possible to reduce the number of gate drivers and making it unnecessary to have a one-for-one switching unit to gate driver. It should be remembered that the cost of switching elements 17 and 18 that allow for selective use of switching units 20 is relatively inexpensive compared to alternative structures that might be used for both charging and traction modes.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. An inverter-charger combination comprising:
   a plurality of first and second switching elements each comprising a plurality of switching units disposed in parallel, the plurality of first and second switching elements being adapted to be electrically coupled to a load and to a rechargeable energy storage system (RESS);

a capacitor, connected in parallel to the plurality of first and second switching elements; and a dual active bridge, connected in parallel to the plurality of first and second switching elements and the capacitor, the dual active bridge being adapted to be electrically coupled to the RESS, wherein each one of the first switching elements is connected in series with one of the second switching elements to form a first switching subassembly, there being provided at least two first switching subassemblies disposed in parallel, each switching subassembly being electrically connected to an alternating current (AC) source, wherein each of the first and the second switching elements comprises a first and a second contactor, wherein, when the first contactor is open and the second contactor is closed, a first electric current is enabled to flow from the RESS in direct current (DC) form to the load in AC form through the plurality of switching elements to provide power to the load, wherein, when the first contactor is closed and the second contactor is open, a second electric current is enabled to flow from the AC source in the AC form to the RESS in the DC form through the plurality of switching elements to charge the RESS, and wherein at least some of the first and second switching elements are configured to have only one or more of the switching units active during RESS charging and all of the switching units active during power transmission to the load.

2. The inverter-charger combination of claim 1, wherein the plurality of first and second switching elements consists of three first and three second switching elements forming three first switching subassemblies, whereby the inverter-charger combination is adapted for three phase operation.

3. The inverter-charger combination of claim 1, further comprising a plurality of third switching elements, two of the third switching elements being disposed in series to form a second switching subassembly, each of the third switching elements comprising a plurality of switching units disposed in parallel, the second switching subassembly being disposed in parallel with the first switching subassemblies and being electrically connected to the load.

4. The inverter-charger combination of claim 3, wherein the plurality of first and second switching elements consists of two first and two second switching elements forming two first switching subassemblies, and wherein the plurality of third switching elements consists of two third switching elements forming the second switching subassembly, whereby the inverter-charger combination is adapted for single phase operation.

5. The inverter-charger combination of claim 1, wherein the switching units are selected from a group consisting of insulated-gate bipolar transistors (IGBT's), metal-oxide-semiconductor field-effect transistors (MOSFET's), silicon carbide (SiC) transistors, or gallium nitride (GAN) transistors.

6. The inverter-charger combination of claim 1, wherein the switching units are IGBT's.

7. The inverter-charger combination of claim 1, wherein the RESS is a battery and the load is a traction motor.

* * * * *